(12) United States Patent
Arya et al.

(10) Patent No.: US 9,060,205 B2
(45) Date of Patent: *Jun. 16, 2015

(54) OPTIMIZING STREAMING OF A GROUP OF VIDEOS

(75) Inventors: Vijay Arya, Bangalore (IN); Malolan Chetlur, Bangalore (IN); Partha Dutta, Bangalore (IN); Shivkumar Kalyanaraman, Bangalore (IN); Kunal Kishore Korgaonkar, Bangalore (IN); Ramana V. Polavarapu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,058

(22) Filed: Aug. 30, 2012

(65) Prior Publication Data

US 2013/0124746 A1  May 16, 2013

Related U.S. Application Data

(63) Continuation of application No. 13/296,853, filed on Nov. 15, 2011.

(51) Int. Cl.
| | |
|---|---|
| G06F 15/16 | (2006.01) |
| H04N 21/61 | (2011.01) |
| H04N 21/2343 | (2011.01) |
| H04N 21/2365 | (2011.01) |
| H04N 21/24 | (2011.01) |
| H04N 21/643 | (2011.01) |
| H04N 21/647 | (2011.01) |

(52) U.S. Cl.
CPC ....... *H04N 21/6125* (2013.01); *H04N 21/2343* (2013.01); *H04N 21/2365* (2013.01); *H04N 21/2401* (2013.01); *H04N 21/2402* (2013.01); *H04N 21/64322* (2013.01); *H04N 21/64792* (2013.01)

(58) Field of Classification Search
None
See application file for complete search history.

(56) References Cited

U.S. PATENT DOCUMENTS

| | | | | |
|---|---|---|---|---|
| 7,916,637 | B2 * | 3/2011 | De Cicco et al. | 370/232 |
| 7,934,239 | B1 * | 4/2011 | Dagman | 725/86 |
| 8,400,918 | B2 * | 3/2013 | Bing | 370/230.1 |
| 2004/0153951 | A1 * | 8/2004 | Walker et al. | 714/776 |
| 2007/0024746 | A1 * | 2/2007 | Cole | 348/515 |
| 2008/0216125 | A1 * | 9/2008 | Li et al. | 725/62 |
| 2008/0259796 | A1 * | 10/2008 | Abousleman et al. | 370/233 |
| 2009/0254657 | A1 * | 10/2009 | Melnyk et al. | 709/224 |
| 2011/0023076 | A1 | 1/2011 | Park et al. | |
| 2011/0271309 | A1 * | 11/2011 | Chetlur et al. | 725/91 |
| 2013/0072271 | A1 * | 3/2013 | Lockton et al. | 463/7 |

FOREIGN PATENT DOCUMENTS

WO  WO2011025502 A1  3/2011

OTHER PUBLICATIONS

International Searching Authority, Search Report for International Application PCT/US2012/063772, Dec. 27, 2012, 1 page (US).

* cited by examiner

*Primary Examiner* — Thomas Dailey
(74) *Attorney, Agent, or Firm* — Ference & Associates LLC

(57) ABSTRACT

Methods and arrangements for optimizing streaming of a group of videos. Throughput of video streams through a common link to at least two different destinations is permitted. An effective flow rate for each video stream is ascertained, and a playout lead for each video stream is estimated. The playout leads are equalized via dynamically changing the effective flow rates of the video streams.

10 Claims, 5 Drawing Sheets

OPTIMIZING STREAMING OF A GROUP OF VIDEOS

CROSS REFERENCE TO RELATED APPLICATION

This application is a continuation of U.S. patent application Ser. No. 13/296,853, entitled OPTIMIZING STREAMING OF A GROUP OF VIDEOS, filed on Nov. 15, 2011, which is incorporated by reference in its entirety.

BACKGROUND

The use of video streaming is rapidly on the increase. Streamed videos tend to be compressed and have a Variable Bit Rate (VBR). Edge-of-network servers often are used to stream a large number of videos, e.g., via a caching proxy that serves cached videos to end users. Many popular video streaming services use TCP (Transmission Control Protocol) as the transport protocol, as it provides reliability, congestion control and traversal across firewalls. The effective rate allocated by TCP to competing streams sharing the same bottleneck link or backhaul depends on network characteristics of the streams, such as the loss rate and Round Trip Time (RTT). However, video service providers typically seek to share a bottleneck link according to end-user quality-of-experience characteristics, such as the number of times a video player buffer under-flows (i.e., the number of video playout stalls). This, along with other conventional solutions, seldom result in optimal streaming and can significantly restrict the number, rate and quality of streams that indeed end up being transported.

BRIEF SUMMARY

In summary, one aspect of the invention provides a method comprising: permitting throughput of video streams through a common link to at least two different destinations; ascertaining an effective flow rate for each video stream; estimating a playout lead for each video stream; and equalizing the playout leads via dynamically changing the effective flow rates of the video streams.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
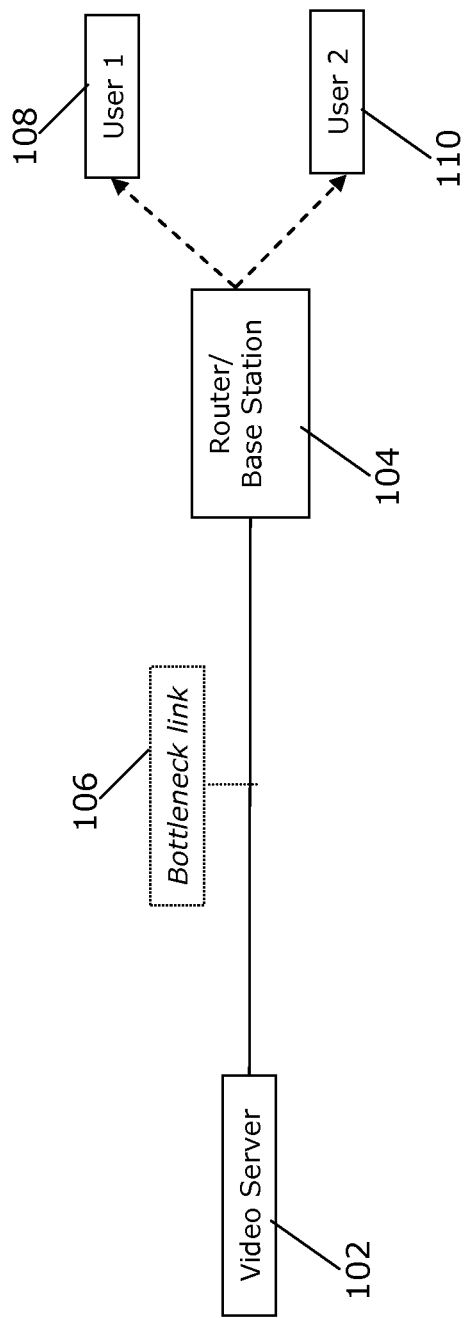
FIG. 1 schematically illustrates a conventional video streaming arrangement.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
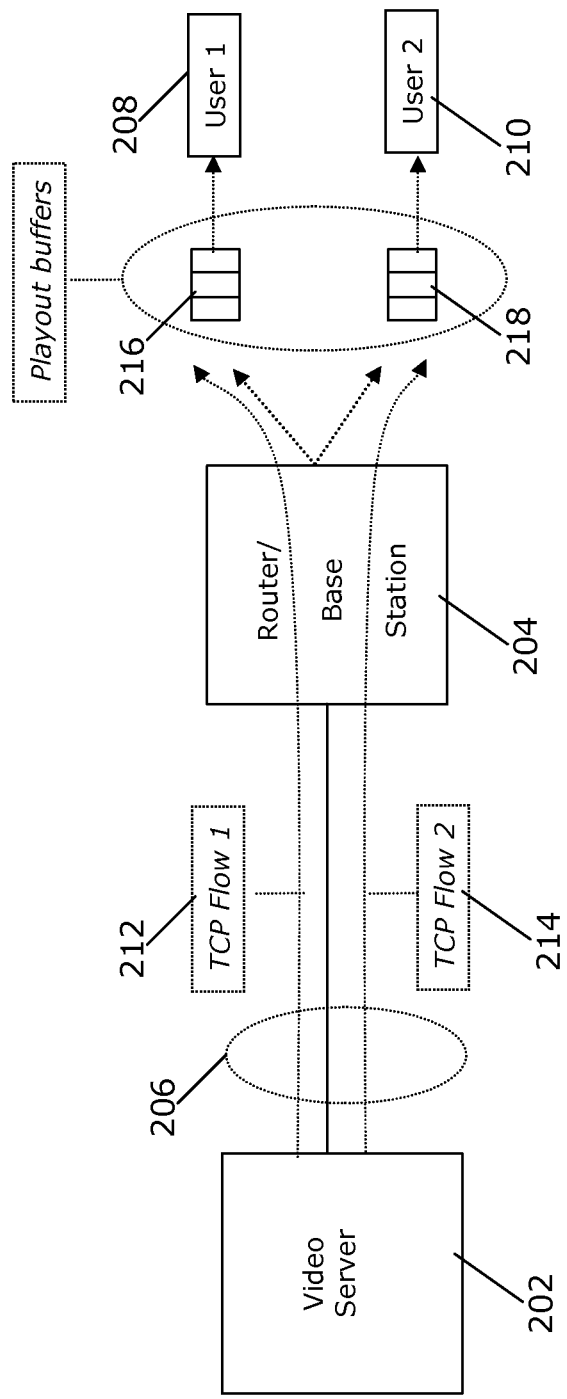
FIG. 2 schematically illustrates the inclusion of playout buffers in a video streaming arrangement.
Figure 3:
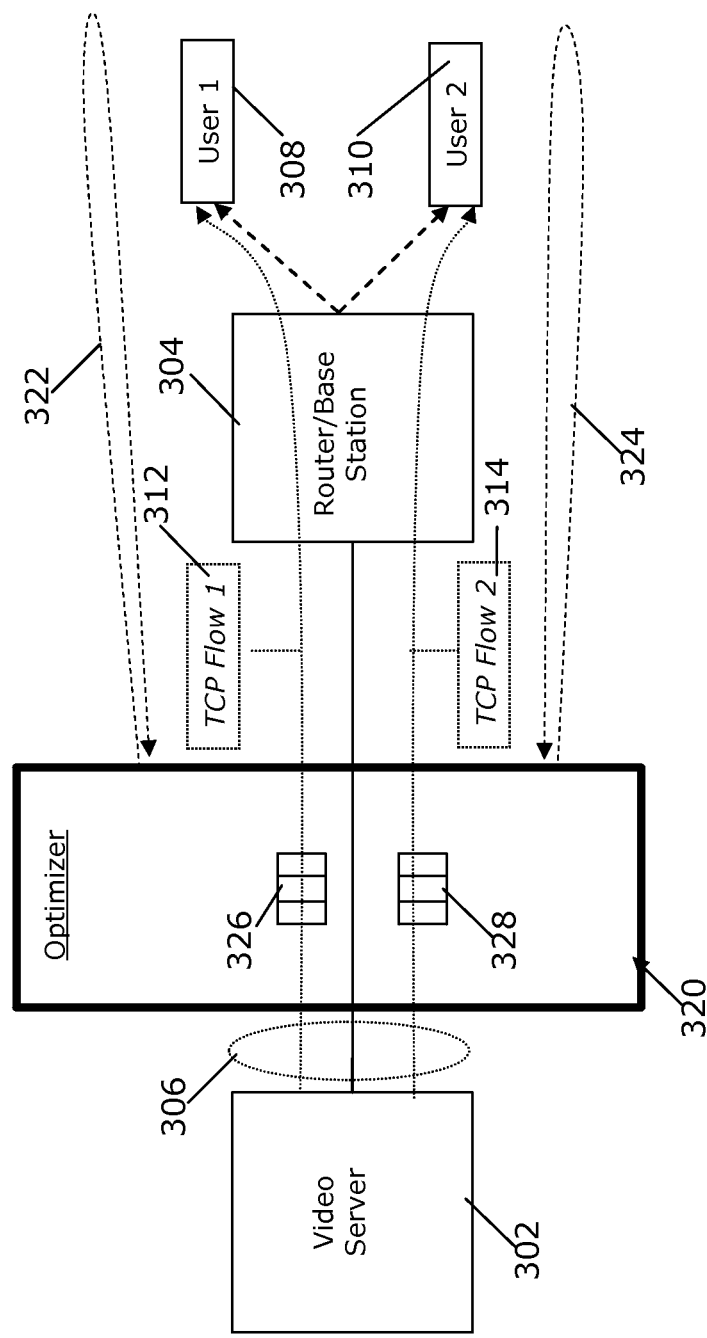
FIG. 3 schematically illustrates the inclusion of a video group optimizer in a video streaming arrangement.

The disclosure now turns to FIGS. 1-3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

To facilitate easier reference, in advancing from FIG. 1 to and through FIG. 3, a reference numeral is advanced by a multiple of 100 in indicating a substantially similar or analogous component or element with respect to at least one component or element found in at least one earlier figure among FIGS. 1-3.

In accordance with at least one embodiment of the invention, there is broadly contemplated herein a system and method to manage the Quality-of-Experience (QoE) of end-users of video streaming over TCP. Network characteristics of flows are gradually changed, e.g., by changing RTT, so as to avoid a sudden drop in TCP throughput, e.g., due to TCP timeout. A significant advantage is that no modifications are required at the user's end or in the TCP/IP (Transmission Control Protocol/Internet Protocol) protocol stack. A conventional video streaming arrangement is shown in FIG. 1. As shown, a video server 102 is connected to a router/base station 104 via a bottleneck link 106, wherein the bottleneck link 106 is configured to handle at least two video streams via a TCP protocol, to be distributed to end users. Two such users 108/110 are shown.

By way of background, in the context of at least one embodiment of the invention, the effective rate of a TCP flow is discussed in *Computer Networking: A Top-Down Approach, Fifth Edition* (James F. Kurose and Keith W. Ross, Addison-Wesley, 2010). As discussed therein, a given flow, the TCP's effective rate is inversely related to Round Trip Time (RTT) and square root of loss rate $\sqrt{p}$. More particularly, $$\text{Effective } TCP \text{ rate} \approx c/(RTT \cdot \sqrt{p}),$$

where c is a constant for a given connection. Under this assumption, multiple competing TCP flows over bottleneck link 106 will share the link according to their RTT and p, and bandwidth is equally shared only if the RTT·$\sqrt{p}$ of all flows are equal. Additionally, the flow rate suddenly drops if there is a timeout of a TCP segment. Timeout value of a flow is dynamically updated to the EstimatedRTT+4.DevRTT, where Estimated RTT and DevRTT are exponentially weighted moving averages of measure RTT value and their deviation, for the previous TCP segments in the flow.

In accordance with at least one embodiment of the invention, in recognizing that the required rate to maintain a given end-user QoE for a VBR video may vary with time, a playout lead-based QoE estimation is used. Essentially, the playout lead of a video stream is the amount of time the user can play out of its buffer without receiving additional video data, while the playback curve of a video specifies the cumulative data requirement of the video by time t from the start of the play. The smaller the playout lead of a video stream at any point of time, the more is its vulnerability to stalling. Accordingly, FIG. 2 illustrates, in accordance with the context of at least one embodiment of the invention, different TCP flows 212 and 214 through bottleneck link 206, destined for different users 208 and 210, respectively. Also shown are playout buffers 216 and 218 generally included with respect to each user 208 and 210, respectively.

In accordance with at least one embodiment of the invention, there is broadly contemplated herein an arrangement for dynamically changing the effective TCP rates of multiple video streams sharing a link such that the playout leads are equal across the flows. To this end, and as shown in FIG. 3, there is provided a video group optimizer (VGO) 320, or a system that is adjacent to the video server 302 at the edge and measures the RTT of TCP flows 312/314 and the effective TCP rate for each flow, as indicated at 322 and 324. Since the VGO 320 is adjacent to the video server 302, it can closely approximate the RTT and rate observed by the video server 302. It is assumed that playback curves for the videos are available at the VGO 320 and that the video server 302 can share the playback curve with VGO 320 in an offline manner; the associated curves normally would not require considerable storage space.

Further, in accordance with at least one embodiment of the invention, for each video stream, based on the starting time of the video transmission and the playback curve, and the amount of data transmitted over the flow, the VGO 320 continuously estimates the lead of each video. The VGO also continuously estimates the timeout value of a stream based on the measured RTT for each segment (by following IETF RFC 2988). (This IETF standard is typically followed in TCP implementations and it is employed to estimate timeout value. For background purposes, see "Computing TCP's Retransmission Timer, RFC 2988" [V. Paxson and M. Allman, Internet Engineering Task Force {IETF}, 2000].) Using the computed playout lead, and the current effective rate of each video stream and timeout value, VGO 320 introduces delays 326 and 328 for the TCP ACKs (acknowledgements) of each flow 312/314, respectively, using a method such as that described herebelow.

In accordance with at least one embodiment of the invention, method steps as described herebelow are executed every $\Phi$ seconds as an iteration of the process. For each video stream, the amount of video data sent is ascertained and recorded. For each video k, the playout lead ld_k is computed, along with TCP timeout to_k. For each video stream k, using the measured TCP rate and RTT_k, a constant $c\_k/\sqrt{p\_k}$ is computed (wherein the assumption is made that loss rate p_k is a constant for this iteration). For each video, the new playout lead pl_k is determined if the current rate is provided to each video for next $\Delta$ sec. A minimum and maximum desired lead is computed (e.g., median lead−D and median lead+D, respectively, where D is a constant) for the videos.

In accordance with at least one embodiment of the invention, then for each video k with (lead pl_k<minimum desired lead m1), delay d_k and associated rate $r\_k=c\_k/((RTT\_k+d\_k)\cdot\sqrt{p\_k})$ are calculated such that the playout lead of the video will increase to m1 if rate r_k is allocated for the video flow for the next $\Delta$ sec. (It should be appreciated that d_k can even be negative here.) A new value of value of d_k is then set to max(0, d_k). On the other hand, for each video k with (lead pl_k>maximum desired lead m2), delay d_k and associated rate $(r\_k=c\_k/((RTT\_k+d\_k)\cdot\sqrt{p\_k}))$ is calculated such that the playout lead of the video will decrease to m2 if rate r_k is allocated for the video flow for the next $\Delta$ sec. The new value of d_k is then set to min(d_k, to_k−RTT_k); to avoid timeout, the new RTT should not exceed to_k.

In accordance with at least one embodiment of the invention, in a remaining possible scenario where for each video k with (minimum desired lead≤lead pl_k≤maximum desired lead), delay d_k remains unchanged. Thence, for each video k, delay d_k is introduced for each TCP ACK of the video flow in the delay queue in VGO 320.

In considering the steps discussed hereinabove, in accordance with at least one embodiment of the invention it should be noted that the value of p_k may change between iterations. Further, $\Delta$ and $\Phi$ are tunable parameters with $\Phi<\Delta$. By way of illustrative and non-restrictive examples, $\Phi$ can be in the range of about 10-15 seconds while $\Delta$ can be in the range of about 2-3 minutes.

Figure 4:
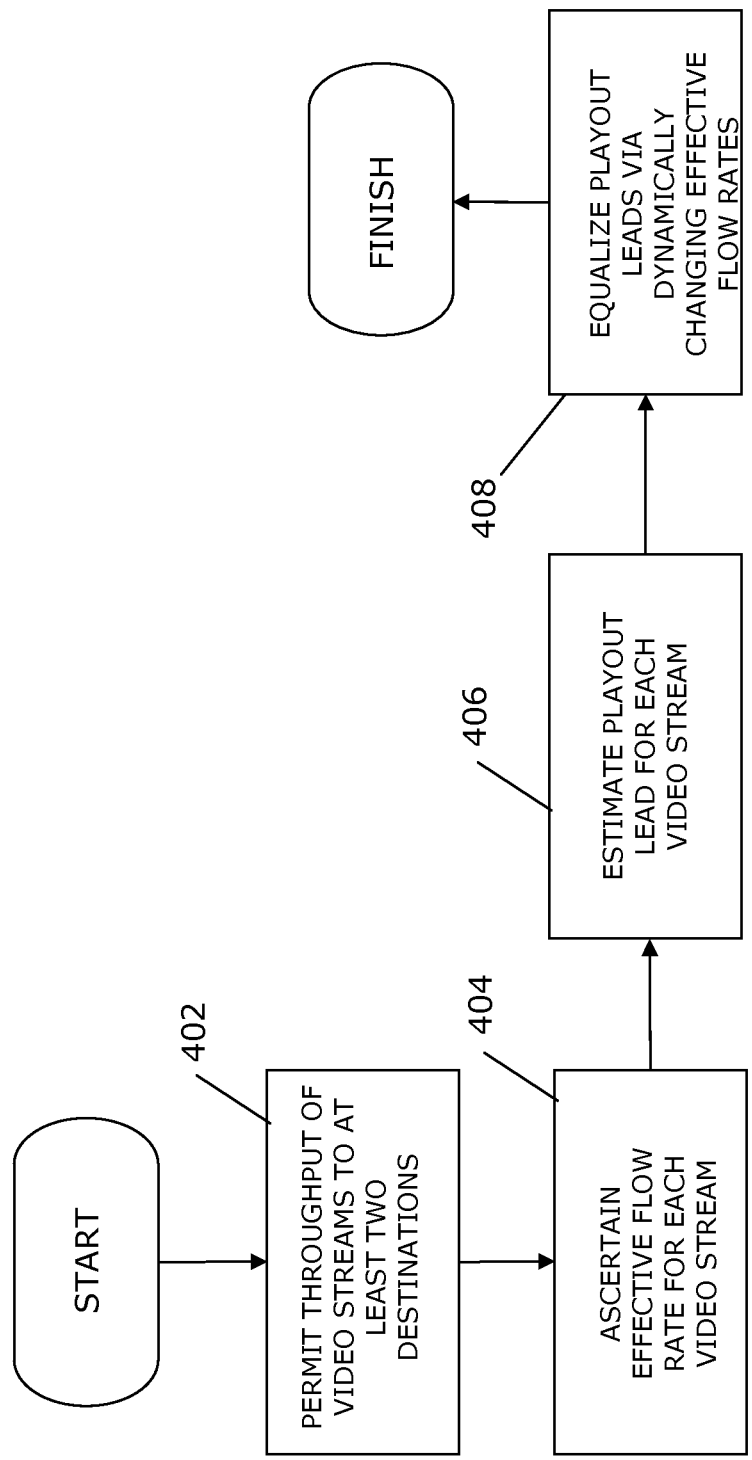
FIG. 4 sets forth a process more generally for optimizing streaming of a group of videos.

FIG. 4 sets forth a process more generally for optimizing streaming of a group of videos, in accordance with at least one embodiment of the invention. It should be appreciated that a process such as that broadly illustrated in FIG. 4 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way a processing unit or units and system memory such as those indicated, respectively, at 16' and 28' in FIG. 5.

As shown in FIG. 4, throughput of video streams through a common link to at least two different destinations is permitted (402). An effective flow rate for each video stream is ascertained (404), and a playout lead for each video stream is estimated (406). The playout leads via dynamically changing the effective flow rates of the video streams (408).

Figure 5:
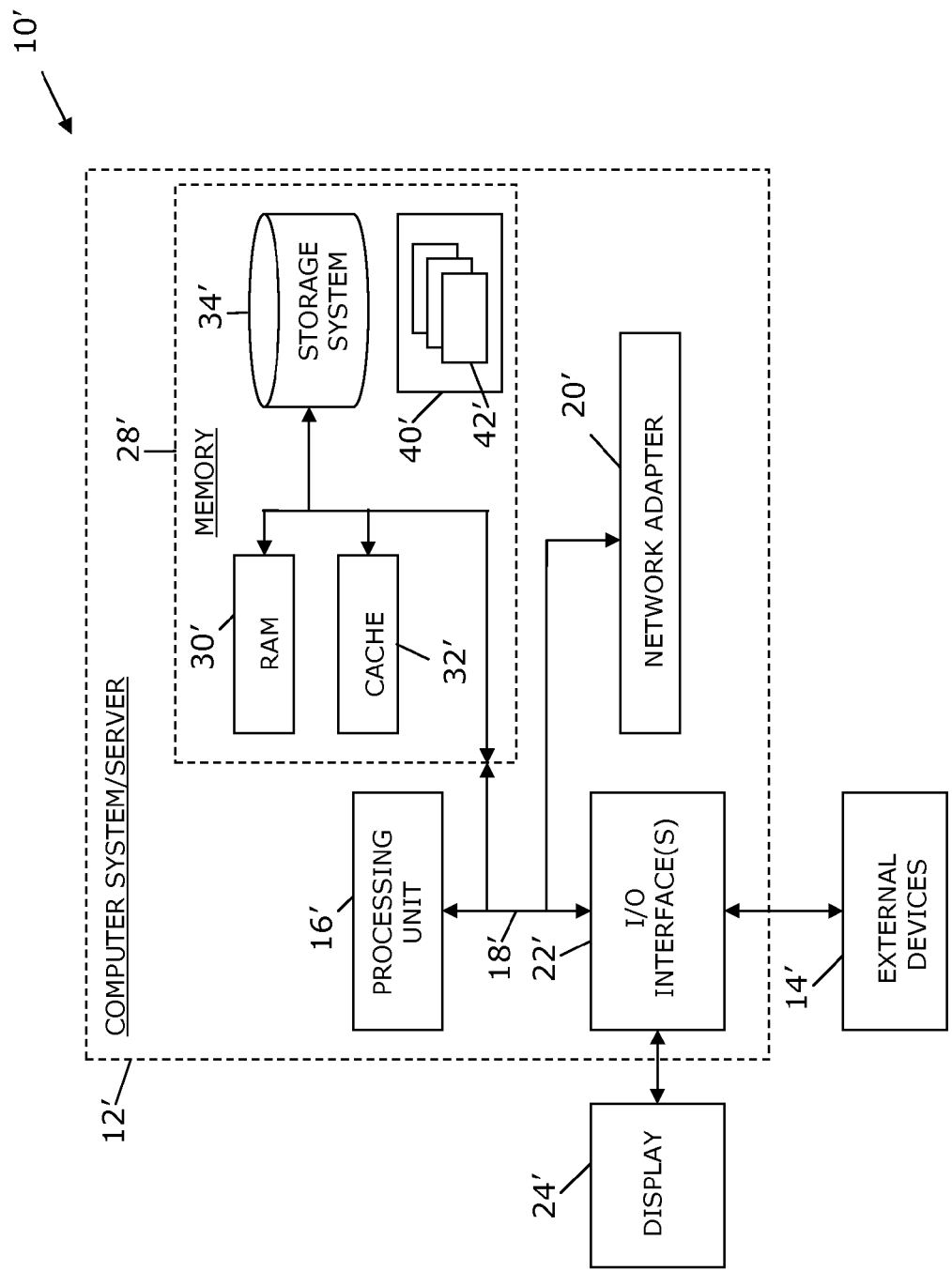
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   permitting throughput of video streams through a common link to at least two different destinations;
   ascertaining an effective flow rate for each video stream;
   estimating a playout lead for each video stream, via measuring a round trip time for each video stream; and
   equalizing the playout leads via dynamically changing the effective flow rates of the video streams;
   said equalizing comprising managing the round trip time of at least one video stream via introducing a delay into at least one video stream, the delay being based on the measured round trip time and at least one other factor for at least one video stream, the at least one other factor comprising at least one of: an estimated timeout value of the at least one video stream and the ascertained effective flow rate of the at least one video stream.

2. The method according to claim 1, wherein said estimating further comprises obtaining a playback curve for each video stream.

3. The method according to claim 1, wherein said estimating further comprises ascertaining a start time of each video stream.

4. The method according to claim 1, wherein:
   the at least one other factor comprises an estimated timeout value of each video stream;
   said estimating further comprises estimating the timeout value of each video stream based on measured round trip times.

5. The method according to claim 4, wherein the at least one other factor comprises the estimated timeout value and ascertained effective flow rate of each video stream.

6. The method according to claim 4, wherein said estimating of the timeout value comprises estimating the timeout value of each video stream continuously.

7. The method according to claim 1, wherein said estimating comprises estimating a playout lead for each video stream continuously.

8. The method according to claim 1, further comprising establishing at least one taken from the group consisting of: a minimum desired playout lead and a maximum desired playout lead.

9. The method according to claim 8, wherein said equalizing comprises adjusting an estimated playout lead to match one taken from said group consisting of: a minimum desired playout lead and a maximum desired playout lead.

10. The method according to claim 1, wherein:
the video streams originate from a video server; and
said measuring comprises measuring at least one round trip time via employing a video group optimizer adjacent to the at least one video server.

* * * * *